(12) United States Patent
Ozeki et al.

(10) Patent No.: US 11,983,877 B2
(45) Date of Patent: May 14, 2024

(54) IMAGE PROCESSING DEVICE, IMAGE PROCESSING METHOD, PROGRAM, AND PORTABLE TERMINAL DEVICE

(71) Applicant: FUJIFILM Corporation, Tokyo (JP)

(72) Inventors: Makoto Ozeki, Tokyo (JP); Kazuyuki Itagaki, Kanagawa (JP); Takatoshi Karino, Kanagawa (JP); Shinji Hayashi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 542 days.

(21) Appl. No.: 17/204,784

(22) Filed: Mar. 17, 2021

(65) Prior Publication Data

US 2021/0201500 A1    Jul. 1, 2021

Related U.S. Application Data

(63) Continuation of application No. PCT/JP2019/035058, filed on Sep. 5, 2019.

(30) Foreign Application Priority Data

Sep. 20, 2018  (JP) .................. 2018-175767

(51) Int. Cl.
*G06T 7/11* (2017.01)
*G06N 20/00* (2019.01)
(Continued)

(52) U.S. Cl.
CPC ............... *G06T 7/11* (2017.01); *G06N 20/00* (2019.01); *G06T 7/149* (2017.01); *G06V 10/25* (2022.01);
(Continued)

(58) Field of Classification Search
CPC . G06T 7/11; G06T 7/149; G06T 2207/20081; G06T 7/00; G06T 7/12;
(Continued)

(56) References Cited

U.S. PATENT DOCUMENTS

2002/0006220 A1   1/2002   Kohchi
2011/0229026 A1*  9/2011   Tsunematsu ............ G06T 7/181
                                                382/165
(Continued)

FOREIGN PATENT DOCUMENTS

EP        3001352 A1 *  3/2016   ........... G06K 9/3283
JP        2001-297303 A   10/2001
(Continued)

OTHER PUBLICATIONS

International Search Report issued in PCT/JP2019/035058; dated Nov. 12, 2019.
(Continued)

*Primary Examiner* — Christopher M Brandt
(74) *Attorney, Agent, or Firm* — Studebaker & Brackett PC

(57) ABSTRACT

There are provided an image processing device, an image processing method, a program, and a portable terminal device which more accurately extract a user's region of interest from an image with fewer operations. The object is solved by an image processing device which divides an acquired image into a plurality of regions, selects at least one region from among the plurality of divided regions, analyzes a relationship between the selected region and a region other than the selected region, and outputs a grouping candidate for a region belonging to the same group as the selected region from the analyzed relationship.

14 Claims, 11 Drawing Sheets

(51) Int. Cl.
    *G06T 7/149*     (2017.01)
    *G06V 10/25*     (2022.01)
    *G06V 10/75*     (2022.01)
    *G06V 10/762*    (2022.01)

(52) U.S. Cl.
    CPC .......... *G06V 10/751* (2022.01); *G06V 10/763* (2022.01)

(58) Field of Classification Search
    CPC ...... G06N 20/00; G06V 10/25; G06V 10/751; G06V 10/763; G06F 18/232; G06F 16/50; G06F 16/55
    See application file for complete search history.

(56) References Cited

U.S. PATENT DOCUMENTS

| | | | | |
|---|---|---|---|---|
| 2014/0226037 | A1* | 8/2014 | Tanaka | G06V 30/1456 348/231.99 |
| 2016/0092745 | A1 | 3/2016 | Wada et al. | |
| 2019/0102608 | A1* | 4/2019 | Wang | H04N 23/611 |

FOREIGN PATENT DOCUMENTS

| | | |
|---|---|---|
| JP | 2005-078290 A | 3/2005 |
| JP | 2016-197362 A | 11/2016 |
| WO | 2013/038872 A1 | 3/2013 |
| WO | 2014/188753 A1 | 11/2014 |

OTHER PUBLICATIONS

International Preliminary Report On Patentability and Written Opinion issued in PCT/JP2019/035058; dated Mar. 23, 2021.

Semantic image segmentation by DeepLab in TensorFlow, Apr. 2018, pp. 1-5, <URL: https://developers-jp.googleblog.com/2018/04/semantic-image-segmentation-with.html>.

Lasso tool of Adobe Photoshop, 2021 Adobe. All rights reserved, pp. 1-8, <URL: https://helpx.adobe.com/jp/photoshop/using/selecting-lasso-tools.html>.

An Office Action; "Notice of Reasons for Refusal", mailed by the Japanese Patent Office dated May 24, 2022, which corresponds to Japanese Patent Application No. 2020-548322 and is related to U.S. Appl. No. 17/204,784; with English language translation.

* cited by examiner

FIG. 9
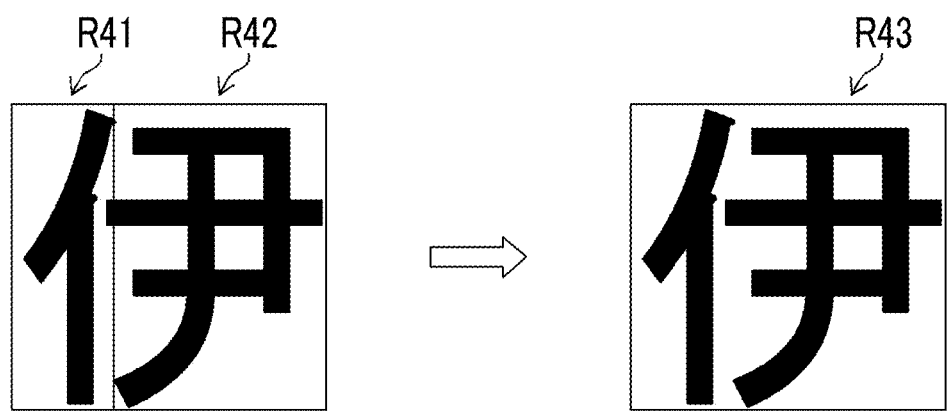
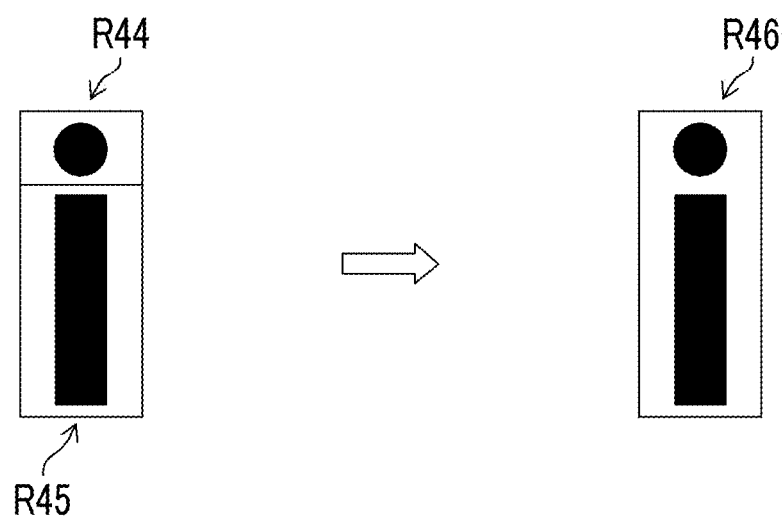

FIG. 11
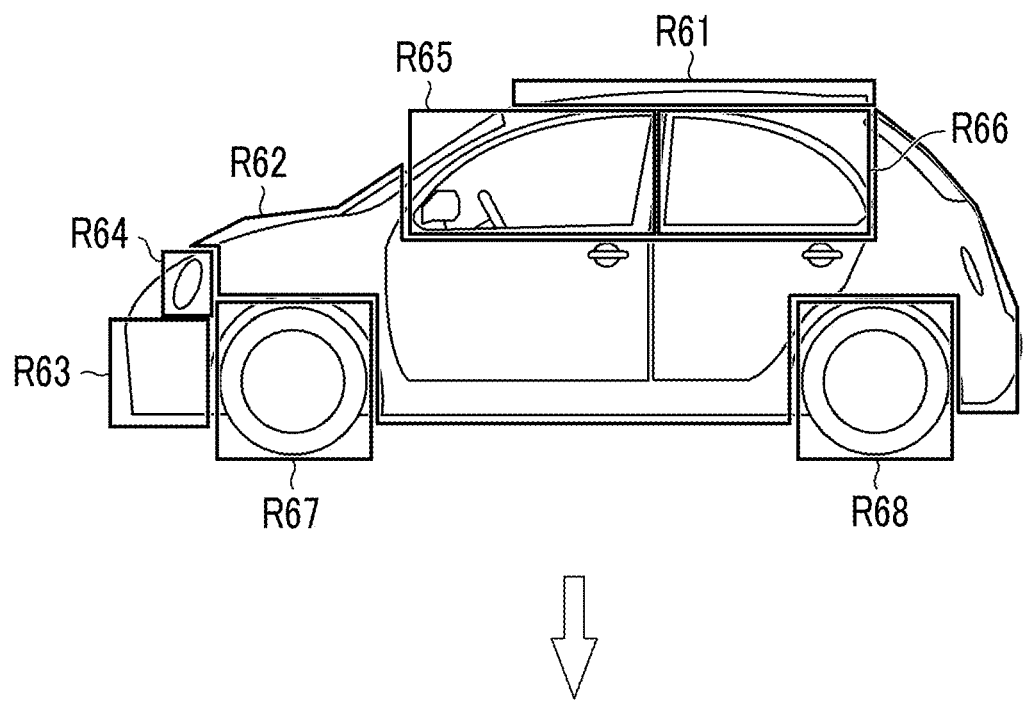
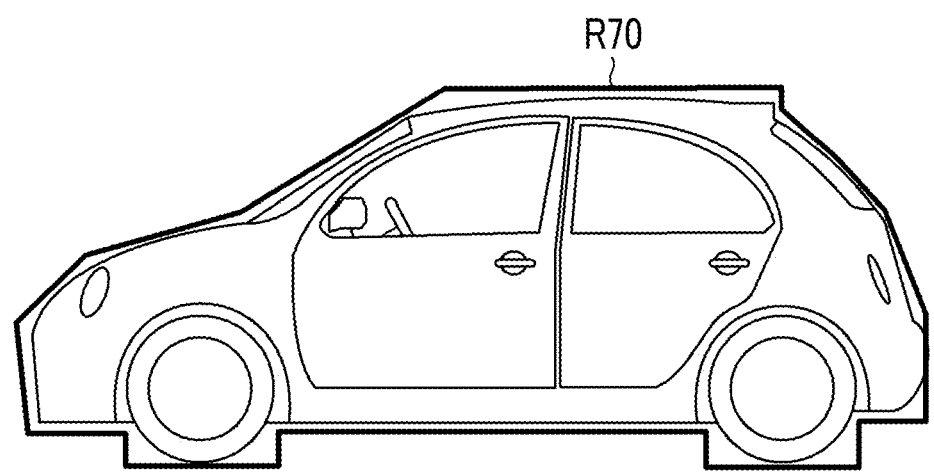

FIG. 12
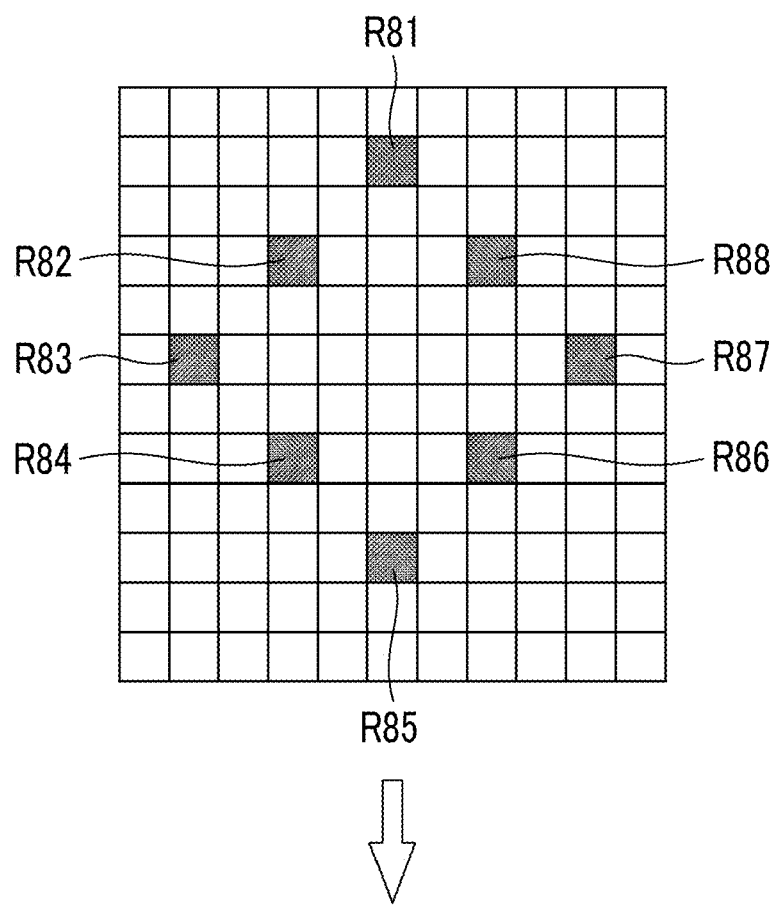
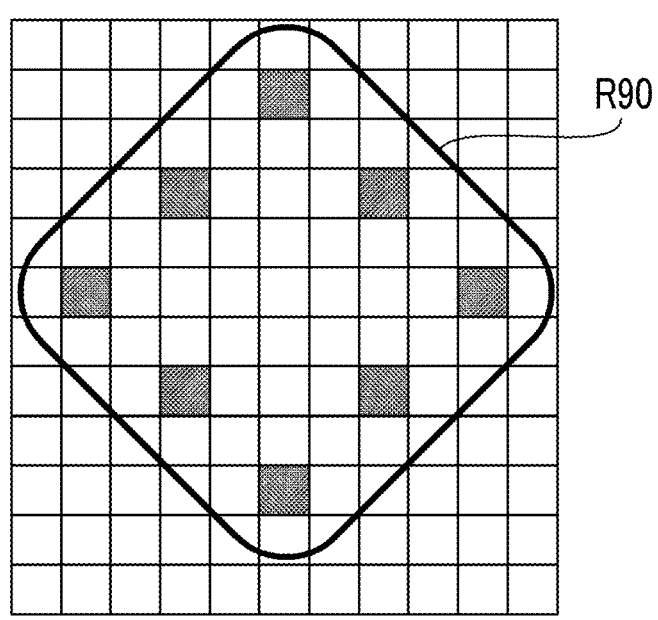

IMAGE PROCESSING DEVICE, IMAGE PROCESSING METHOD, PROGRAM, AND PORTABLE TERMINAL DEVICE

CROSS-REFERENCE TO RELATED APPLICATIONS

The present application is a Continuation of PCT International Application No. PCT/JP2019/035058 filed on Sep. 5, 2019 claiming priority under 35 U.S.C § 119(a) to Japanese Patent Application No. 2018-175767 filed on Sep. 20, 2018. Each of the above applications is hereby expressly incorporated by reference, in its entirety, into the present application.

BACKGROUND OF THE INVENTION

1. Field of the Invention

The present invention relates to an image processing device, an image processing method, a program, and a portable terminal device, and particularly relates to a technique of extracting a region of interest from an image.

2. Description of the Related Art

There is a demand for a user to extract a desired region of interest from an image. In order to realize such a demand, in Semantic image segmentation by DeepLab in TensorFlow <URL:https://developers-jp.googleblog.com/2018/04/semantic-image-segmentation-with.html>, a technique is disclosed in which segmentation is performed by assigning meaningful labels to all pixel in the image by using artificial intelligence (AI). Further, in Lasso tool of Adobe Photoshop <URL: https://helpx.adobe.com/jp/photoshop/using/selecting-lasso-tools.html>, a technique is disclosed in which a user designates a selection range by dragging and inputting in a single stroke manner.

In JP2005-078290A, a technique is disclosed in which a partial region is selected from one image for image processing such as enlargement or trimming.

SUMMARY OF THE INVENTION

However, the technique disclosed in Semantic image segmentation by DeepLab in TensorFlow <URL: https://developers-jp.googleblog.com/2018/04/semantic-image-segmentation-with.html> has a problem that data which is not used at the time of creating AI cannot be handled. In addition, the technique disclosed in Lasso tool of Adobe Photoshop <URL: https://helpx.adobe.com/jp/photoshop/using/selecting-lasso-tools.html> has a problem that many operations are performed for selecting a fine region or modifying an erroneous selection.

Further, in the technique disclosed in JP2005-078290A, the output partial region is limited to a rectangular region, and thus a non-rectangular region cannot be extracted.

The present invention has been made in view of such circumstances, and an object thereof is to provide an image processing device, an image processing method, a program, and a portable terminal device which more accurately extract a user's region of interest from an image with fewer operations.

An aspect of an image processing device for achieving the object is an image processing device comprising an image acquisition unit that acquires an image; a region division unit that divides the acquired image into a plurality of regions; a selection unit that selects at least one region from among the plurality of divided regions; an analysis unit that analyzes a relationship between the selected region and a region other than the selected region; and an output unit that outputs a grouping candidate for a region belonging to the same group as the selected region from the analyzed relationship.

According to the aspect, since the acquired image is divided into the plurality of regions, at least one region is selected from among the plurality of divided regions, the relationship between the selected region and the region other than the selected region is analyzed, and the grouping candidate for the region belonging to the same group as the selected region is output from the analyzed relationship, it is possible to more accurately extract the user's region of interest as the grouping candidate from the image with fewer operations.

It is preferable that the output unit outputs a plurality of the grouping candidates. Accordingly, it is possible to more accurately extract the user's region of interest.

It is preferable that the selection unit selects the at least one region on the basis of a user's input. Further, the selection unit may select the at least one region on the basis of a trained machine learning model. Accordingly, it is possible to appropriately extract the region of interest.

It is preferable that the image processing device further comprises a processing unit that performs correction processing on the grouping candidate. Accordingly, it is possible to extract the region of interest subjected to the correction processing.

It is preferable that the correction processing is geometric transformation processing. Accordingly, it is possible to extract the region of interest subjected to the geometric transformation processing.

It is preferable that the correction processing is processing of modifying a contour line. Accordingly, it is possible to extract the region of interest of which the contour line is modified.

It is preferable that the region division unit performs division into the plurality of regions by performing clustering on the basis of pixel information. Accordingly, it is possible to appropriately divide the image into the plurality of regions.

It is preferable that the analysis unit analyzes a relationship between the selected region and a region adjacent to the selected region. Accordingly, it is possible to appropriately output the grouping candidate.

It is preferable that the analysis unit analyzes a similarity degree between the selected region and the region other than the selected region. Accordingly, it is possible to appropriately output the grouping candidate.

It is preferable that the analysis unit analyzes the relationship on the basis of a trained machine learning model. Accordingly, it is possible to appropriately output the grouping candidate.

It is preferable that the image processing device further comprises a limiting unit that limits a range from the acquired image, and the region division unit divides the image within the limited range into the plurality of regions. Accordingly, it is possible to extract the region of interest from a necessary range in the image, and to reduce the amount of calculation.

An aspect of a portable terminal device for achieving the object is a portable terminal device comprising the above-described image processing device; an imaging lens; an imaging element that captures an optical image formed by the imaging lens; and a display unit, in which the image acquisition unit acquires image data output from the imaging element as an image, and the output unit displays the grouping candidate on the display unit.

According to the aspect, it is possible to more accurately extract the user's region of interest from the captured image with fewer operations, and to display the extracted grouping candidate on the display unit.

An aspect of an image processing method for achieving the object is an image processing method comprising an image acquisition step of acquiring an image; a region division step of dividing the acquired image into a plurality of regions; a selection step of selecting at least one region from among the plurality of divided regions; an analysis step of analyzing a relationship between the selected region and a region other than the selected region; and an output step of outputting a grouping candidate for a region belonging to the same group as the selected region from the analyzed relationship.

According to the aspect, it is possible to more accurately extract the user's region of interest from the image with fewer operations. A program for causing a computer to execute the above-described image processing method is also included in the aspect.

According to the invention, it is possible to more accurately extract the user's region of interest from the image with fewer operations.

BRIEF DESCRIPTION OF THE DRAWINGS

FIG. 9 is a diagram illustrating an example in which a character is divided into a plurality of regions.

FIG. 11 is a diagram illustrating an example in which each region constitutes one object.

FIG. 12 is a diagram illustrating an example in which regions that are not adjacent to each other constitute one object.

DESCRIPTION OF THE PREFERRED EMBODIMENTS

Hereinafter, preferred embodiments of the invention will be described in detail with reference to the accompanying drawings.

<Tablet Type Computer Terminal>

An image processing device according to an embodiment can accurately extract a user's region of interest from an image with fewer operations. For example, a region of a logo or signboard that the user is interested in can be extracted from an image in which the logo or signboard is shown. In addition, a region of a face paint pattern can be extracted from an image in which a face with face paint is shown.

Figure 1:
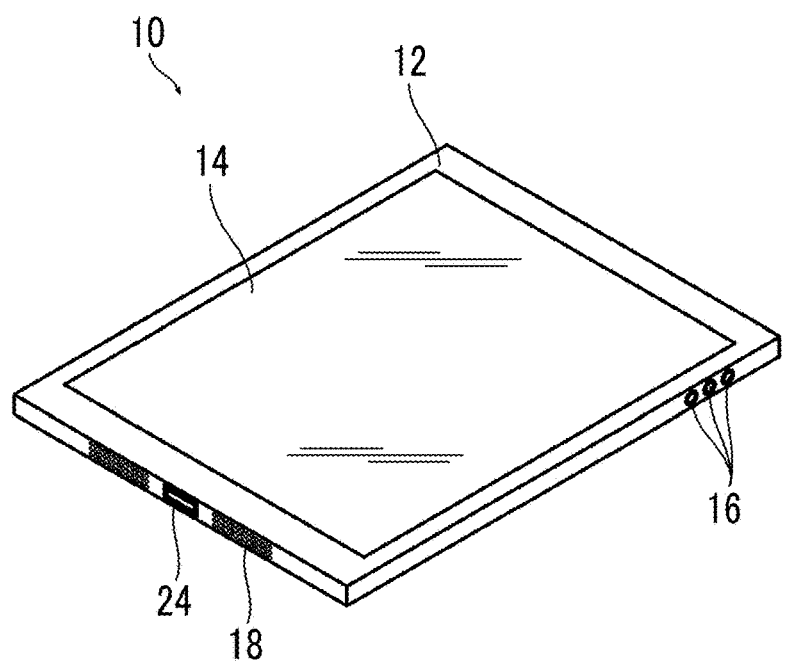
FIG. 1 is a front perspective view of a tablet PC.
Figure 2:
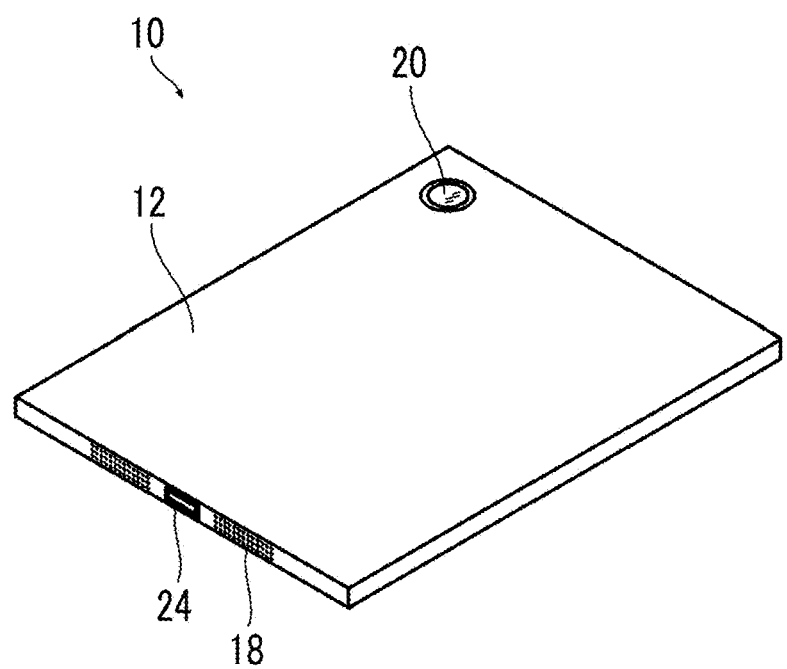
FIG. 2 is a rear perspective view of the tablet PC.

FIG. 1 is a front perspective view of a tablet type computer terminal 10 (hereinafter, referred to as a tablet PC 10; PC is an abbreviation for personal computer) which is an example of a portable terminal device to which the image processing device according to the embodiment is applied, and FIG. 2 is a rear perspective view. As illustrated in FIGS. 1 and 2, the tablet PC 10 comprises a flat plate-shaped housing 12 having a rectangular contour. The housing 12 comprises a touch panel display 14, operation buttons 16, a speaker 18, a built-in camera 20, and an external connection terminal 24.

Figure 3:
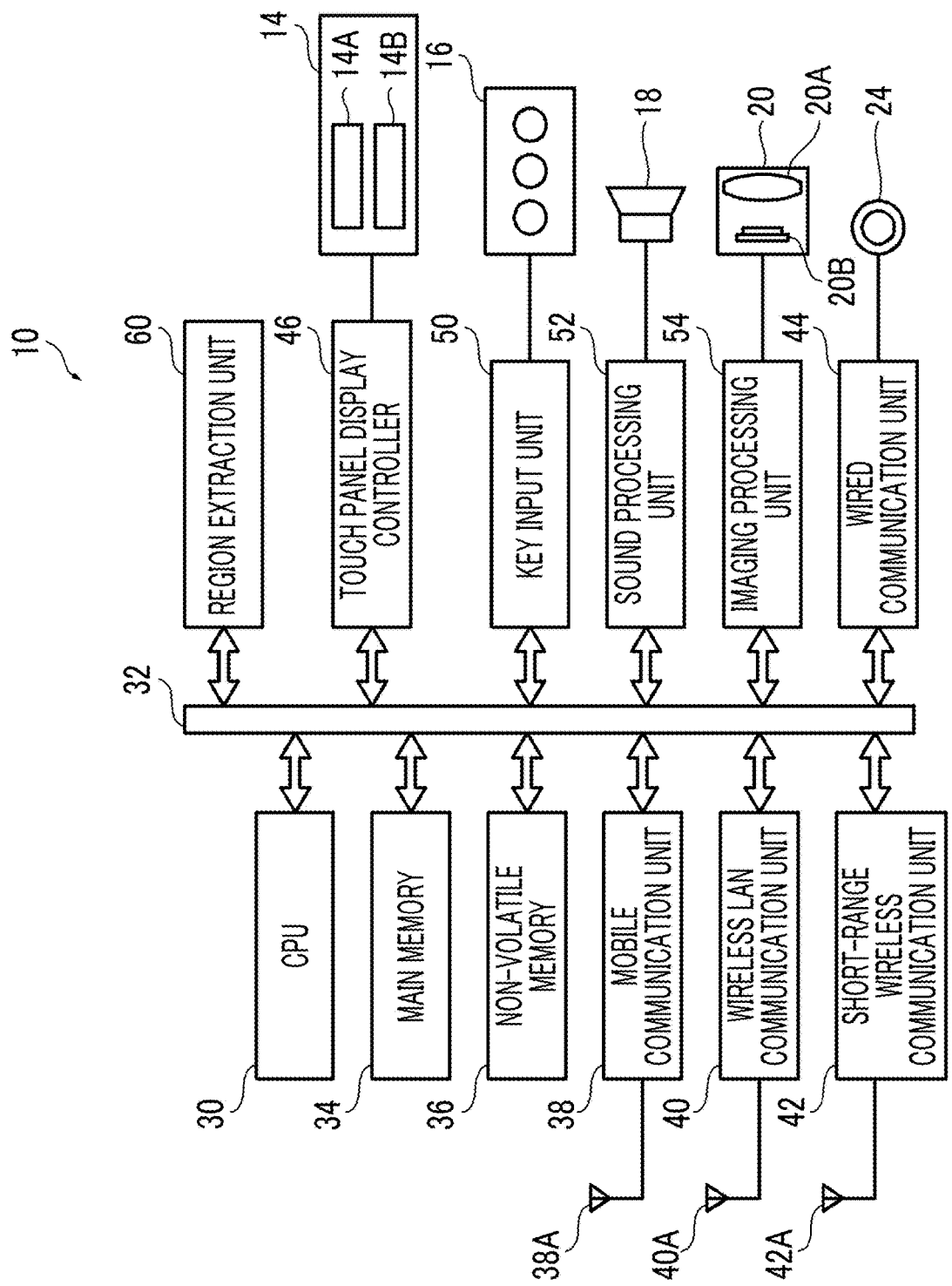
FIG. 3 is a block diagram illustrating a system configuration of the tablet PC.

FIG. 3 is a block diagram illustrating a system configuration of the tablet PC 10. As illustrated in FIG. 3, the tablet PC 10 comprises a central processing unit (CPU) 30 that controls the overall operation of the tablet PC 10. A main memory 34, a non-volatile memory 36, a mobile communication unit 38, a wireless local area network (LAN) communication unit 40, a short-range wireless communication unit 42, a wired communication unit 44, a touch panel display controller 46, a key input unit 50, a sound processing unit 52, an imaging processing unit 54, and a region extraction unit 60 are connected to the CPU 30 via a system bus 32.

The CPU 30 functions as a controller that controls the operation of the entire computer by reading an operating system (OS), an application program running on the OS, structured data, and the like stored in the non-volatile memory 36 and expanding those into the main memory 34 to execute an operation program.

The main memory 34 is composed of, for example, a random access memory (RAM), and functions as a work memory of the CPU 30.

The non-volatile memory 36 is composed of, for example, a flash electrically erasable programmable read only memory (EEPROM), and stores the OS, application programs, and various kinds of structured data. Further, the non-volatile memory 36 functions as a storage unit of the tablet PC 10, and stores various kinds of data.

The mobile communication unit 38 performs transmission and reception of data with the nearest wireless base station (not illustrated) via an antenna 38A by 4th generation mobile communication system (4G) or 5th generation mobile communication system (5G).

The wireless LAN communication unit 40 performs wireless LAN communication according to, for example, the wireless LAN communication standard such as the Institute of Electrical and Electronics Engineers (IEEE) 802.11a/b/g/n, with a wireless LAN access point or an external device capable of performing wireless LAN communication via an antenna 40A.

The short-range wireless communication unit 42 performs communication with other Bluetooth (registered trademark) standard devices in a range of, for example, Class 2 (within a radius of about 10 m) via an antenna 42A.

The wired communication unit 44 performs communication according to a predetermined communication standard with an external device connected to a cable (not illustrated) via the external connection terminal 24.

The touch panel display 14 (an example of a display unit) comprises a display section 14A such as a color liquid crystal display (LCD) panel which displays an image and the like, and a touch panel section 14B such as a transparent electrode which is arranged in front of the color LCD panel and accepts a touch input.

The touch panel section 14B is a capacitive touch panel which is made of, for example, glass or plastic, and has a substrate main body having optical transmittance, a position detection electrode that is provided on the substrate main body in a planar shape and has optical transmittance, and an insulating layer that is provided on the position detection electrode. The touch panel section 14B is arranged in front of the display section 14A, and generates and outputs two-dimensional position coordinate information corresponding to the user's touch operation.

The touch panel display controller 46 controls the touch panel display 14. The touch panel display controller 46 associates the coordinates of the image displayed on the display section 14A with the coordinates where the touch operation is performed in the touch panel section 14B.

In the following description, the display of the display section 14A and the touch operation on the touch panel section 14B are simply referred to as the display of the touch panel display 14 and the operation on the touch panel display 14.

The key input unit 50 is composed of a drive circuit that drives the plurality of operation buttons 16.

The sound processing unit 52 converts digital sound data given via the system bus 32 into an analog sound signal. The analog sound signal is reproduced and output from the speaker 18.

The built-in camera 20 comprises an imaging lens 20A, and an imaging element 20B. The imaging lens 20A forms an optical image of an incident subject. The imaging element 20B captures the formed optical image, and outputs an analog image signal.

The imaging processing unit 54 digitizes the analog image signal output from the built-in camera 20 (imaging element 20B), performs required signal processing, and outputs the resultant.

The region extraction unit 60 is an image processing device that extracts a user's region of interest from the image displayed on the touch panel display 14.

Figure 4:
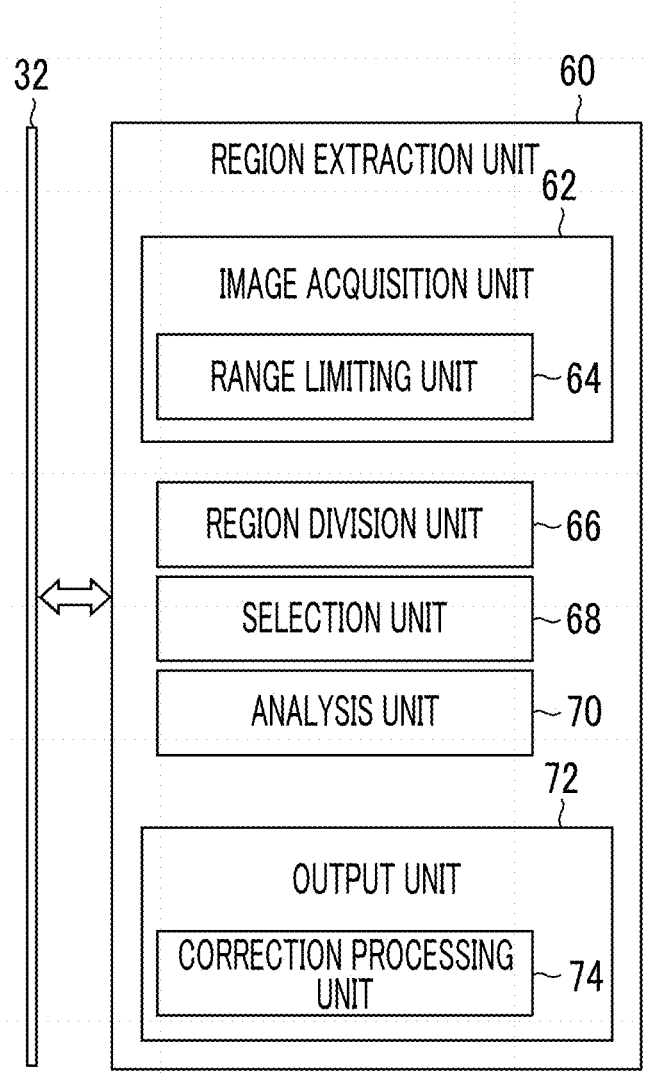
FIG. 4 is a block diagram illustrating a system configuration of a region extraction unit.

FIG. 4 is a block diagram illustrating a system configuration of the region extraction unit 60. As illustrated in FIG. 4, the region extraction unit 60 comprises an image acquisition unit 62, a region division unit 66, a selection unit 68, an analysis unit 70, and an output unit 72.

The touch panel display controller 46 (refer to FIG. 3) acquires a captured image (an example of image data output from the imaging element) captured by the built-in camera 20, for example, and displays the captured image on the touch panel display 14. The touch panel display controller 46 may acquire an image read from the non-volatile memory 36 and display the image on the touch panel display 14 or may display an image acquired via the mobile communication unit 38, the wireless LAN communication unit 40, the short-range wireless communication unit 42, and the wired communication unit 44 on the touch panel display 14. The image acquisition unit 62 acquires the image displayed on the touch panel display 14. The image acquired by the image acquisition unit 62 may be a video.

In addition, the image acquisition unit 62 comprises a range limiting unit 64. The range limiting unit 64 limits a range of the image acquired by the image acquisition unit 62, according to the user's input, for example. The user's input to the range limiting unit 64 is performed by the user performing the touch operation such as surrounding a desired range of the image using the touch panel display 14.

The region division unit 66 divides the image acquired by the image acquisition unit 62 into a plurality of regions, as preprocessing. In a case where the range of the image is limited by the range limiting unit 64, the region division unit 66 divides the range, which is limited by the range limiting unit 64, of the image acquired by the image acquisition unit 62 into a plurality of regions. Accordingly, it is possible to reduce the calculation of extracting the region of interest as compared with a case where the entire image is divided into a plurality of regions.

The region division unit 66 divides the image into a plurality of regions by clustering on the basis of, for example, pixel information. Accordingly, it is possible to appropriately divide the image into a plurality of regions. Further, the region division unit 66 may divide the image into a plurality of regions by applying, for example, Simple Linear Iterative Clustering (SLIC). SLIC is an algorithm that outputs a division into a superpixel obtained by clustering pixels that are close in distance and color, with the image as an input. As preprocessing of the image recognition, by calculating superpixels, the amount of information of the image can be reduced, and other image recognition algorithms can be easily applied.

The selection unit 68 selects at least one region from among the plurality of divided regions. The selection unit 68 selects a region on the basis of the user's input, for example. The user's input to the selection unit 68 is performed by the user performing the touch operation such as tracing a desired region of the image or surrounding a desired range of the image using the touch panel display 14. It is possible to appropriately extract a region of interest by the user selecting the region.

Further, the selection unit 68 may select a region on the basis of a trained machine learning model. In this case, a division result of the region division unit 66 is input to the trained machine learning model, a region of interest of a general user is estimated in the trained machine learning model, and the estimated region of interest is used as the output of the selection unit 68. By selecting a region on the basis of the trained machine learning model, it is possible to reduce the user's operation, and it is possible to appropriately extract a region of interest.

The trained machine learning model may be additionally trained using the region of interest selected by the user as training data.

The analysis unit 70 analyzes a relationship (identity or similarity) between the region selected by the selection unit 68 and a region other than the selected region. The analysis performed by the analysis unit 70 includes analyzing a similarity degree of each region from similarity degrees of pixel values of the color, brightness, and the like of pixels included in each region. The maximum similarity degree means that both regions are the same region. It is possible to output appropriate grouping candidates by analyzing the similarity degree.

Further, the analysis performed by the analysis unit 70 is not limited to the analysis of the similarity degree. For example, the analysis performed by the analysis unit 70 includes analyzing whether the regions are in a relation that has meaning as an object, a character, or a character string in a case where the regions are combined. In this case, for the analysis unit 70, the trained machine learning model is preferably used.

The output unit 72 outputs grouping candidates for a region belonging to the same group as the region selected by the selection unit 68, from the relationship analyzed by the analysis unit 70. The output unit 72 displays a grouping candidate with, for example, the highest confidence level on the touch panel display 14 via the touch panel display controller 46. In a case where there are a plurality of grouping candidates, the display of the grouping candidate may be switched to the display of the different grouping candidate according to the user's operation on the touch panel display 14.

In addition, the output unit 72 may display the plurality of grouping candidates in a list on the touch panel display 14 by sorting the plurality of grouping candidates according to the confidence level.

For the output unit 72, the trained machine learning model may be applied. In addition, the respective trained machine learning models of the selection unit 68, the analysis unit 70, and the output unit 72 can be trained at the same time. Here, the trained machine learning model may be additionally trained by applying a different training data set. That is, the trained machine learning model is not limited to the one for which the training is completed, but includes the one that can be updated later.

The output unit 72 comprises a correction processing unit 74. The correction processing unit 74 performs correction processing on the grouping candidate. The correction processing is geometric transformation processing such as distortion correction, for example. Further, the correction processing may be processing of modifying a contour line. The output unit 72 outputs the grouping candidate subjected to the correction processing by the correction processing unit 74. In this manner, the output unit 72 can output the grouping candidate which is subjected to the geometric transformation processing or of which the contour line is modified.

<Image Processing Method>

Figure 5:
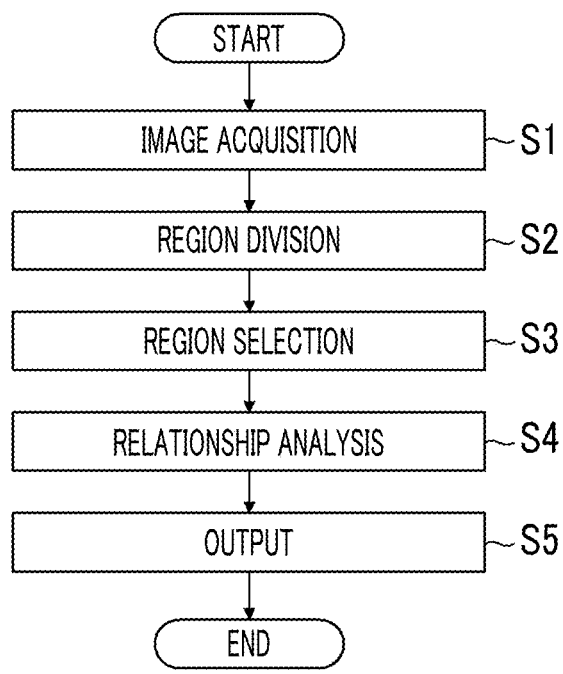
FIG. 5 is a flowchart illustrating an image processing method.

FIG. 5 is a flowchart illustrating an image processing method by the tablet PC 10. As illustrated in FIG. 5, the image processing method includes an image acquisition step (Step S1), a region division step (Step S2), a region selection step (Step S3), a relationship analysis step (Step S4), and an output step (Step S5).

In Step S1, the image acquisition unit 62 acquires the image displayed on the touch panel display 14. Here, the range limiting unit 64 limits a range, which is surrounded by the user's touch operation on the touch panel display 14, of the image displayed on the touch panel display 14.

Figure 6:
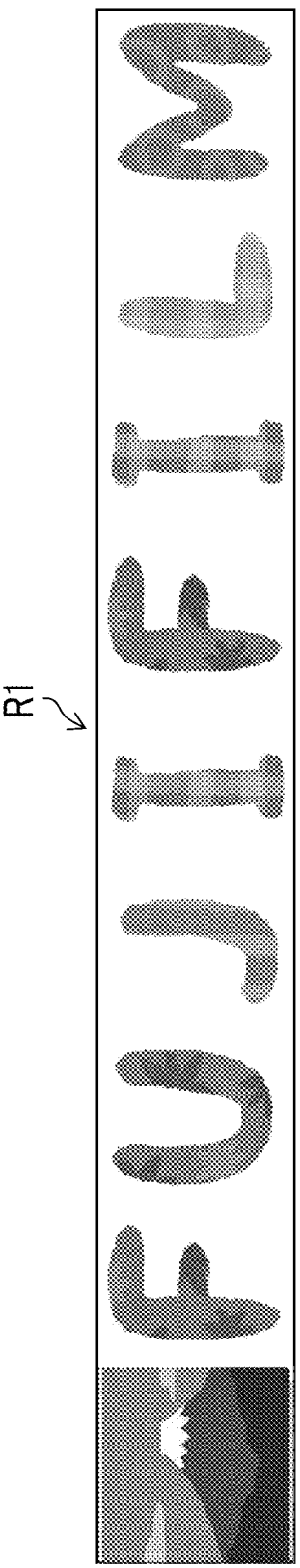
FIG. 6 is a diagram illustrating an example of an image, which is in a range limited by a range limiting unit, in an image acquired by an image acquisition unit.

FIG. 6 is a diagram illustrating an example of a range, which is limited by the range limiting unit 64, of the image acquired by the image acquisition unit 62. As illustrated in FIG. 6, a region R1 is a region in a range limited by the range limiting unit 64.

In Step S2, the region division unit 66 divides the image acquired by the image acquisition unit 62 into a plurality of regions. Here, the region division unit 66 divides the range, which is limited by the range limiting unit 64, of the image acquired by the image acquisition unit 62 into the plurality of regions.

Figure 7:
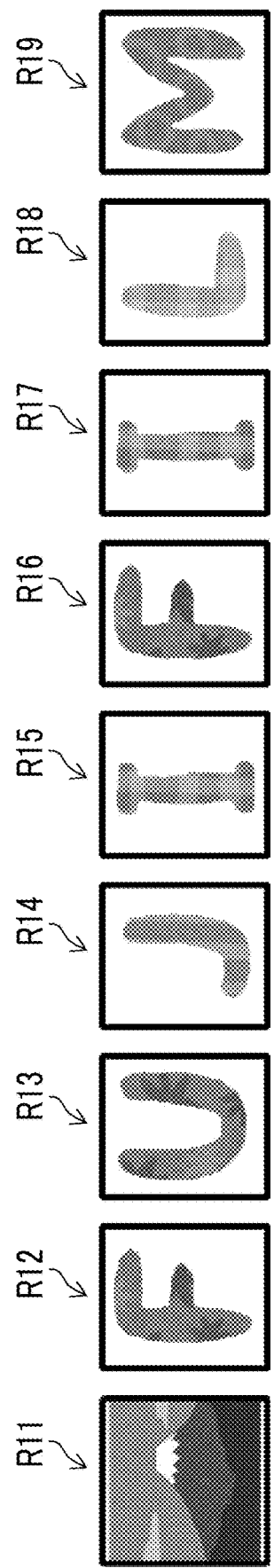
FIG. 7 is a diagram illustrating an example of a plurality of regions divided by a region division unit.

FIG. 7 is a diagram illustrating an example of the plurality of regions divided by the region division unit 66. As illustrated in FIG. 7, the region R1 illustrated in FIG. 6 is divided into a plurality of regions R11 to R19.

In Step S3, the selection unit 68 selects at least one region from among the plurality of divided regions. Here, for example, the touch panel display controller 46 causes the touch panel display 14 to perform a display to encourage the user to select a region. In response to this, the user surrounds a desired region by the touch operation on the touch panel display 14. The selection unit 68 selects the region surrounded by the user's touch operation, from among the plurality of regions displayed on the touch panel display 14.

For example, it is assumed that the region R13 is selected from among the plurality of regions R11 to R19 illustrated in FIG. 7.

In Step S4, the analysis unit 70 analyzes a relationship between the region selected in Step S3 and the regions other than the selected region. The analysis unit 70 analyzes the similarity degree of pixel values of the color, brightness, and the like of pixels included in each region, for example, for the selected region R13 and the regions R11, R12, and R14 to R19 other than the region R13. Further, a relationship of the distance between the regions may be analyzed. Here, the distance may be a distance in pixel units or a distance which has been converted to actual size. It is considered that the relationship is higher as the distance between the regions is closer.

Further, the analysis unit 70 may analyze a relationship between the selected region R13 and the region R14 adjacent to the region R13. Here, in a case where it is determined that the relationship between the region R13 and the region R14 is high, the analysis unit 70 analyzes a relationship between the region R13 and the region R15 adjacent to the region R14. In this manner, in a case where the adjacent region is a region with a high relationship, the analysis unit 70 may analyze a relationship by expanding the adjacent regions in order. It is possible to output appropriate grouping candidates by analyzing the relationship with the adjacent regions.

In Step S5, the output unit 72 outputs the grouping candidates for a region belonging to the same group as the region selected in Step S3, from the relationship analyzed in Step S4. In the correction processing unit 74, geometric transformation processing or processing of modifying a contour line may be performed. Here, the output unit 72 displays two grouping candidates on the touch panel display 14 by sorting the grouping candidates according to the confidence level.

Figure 8:
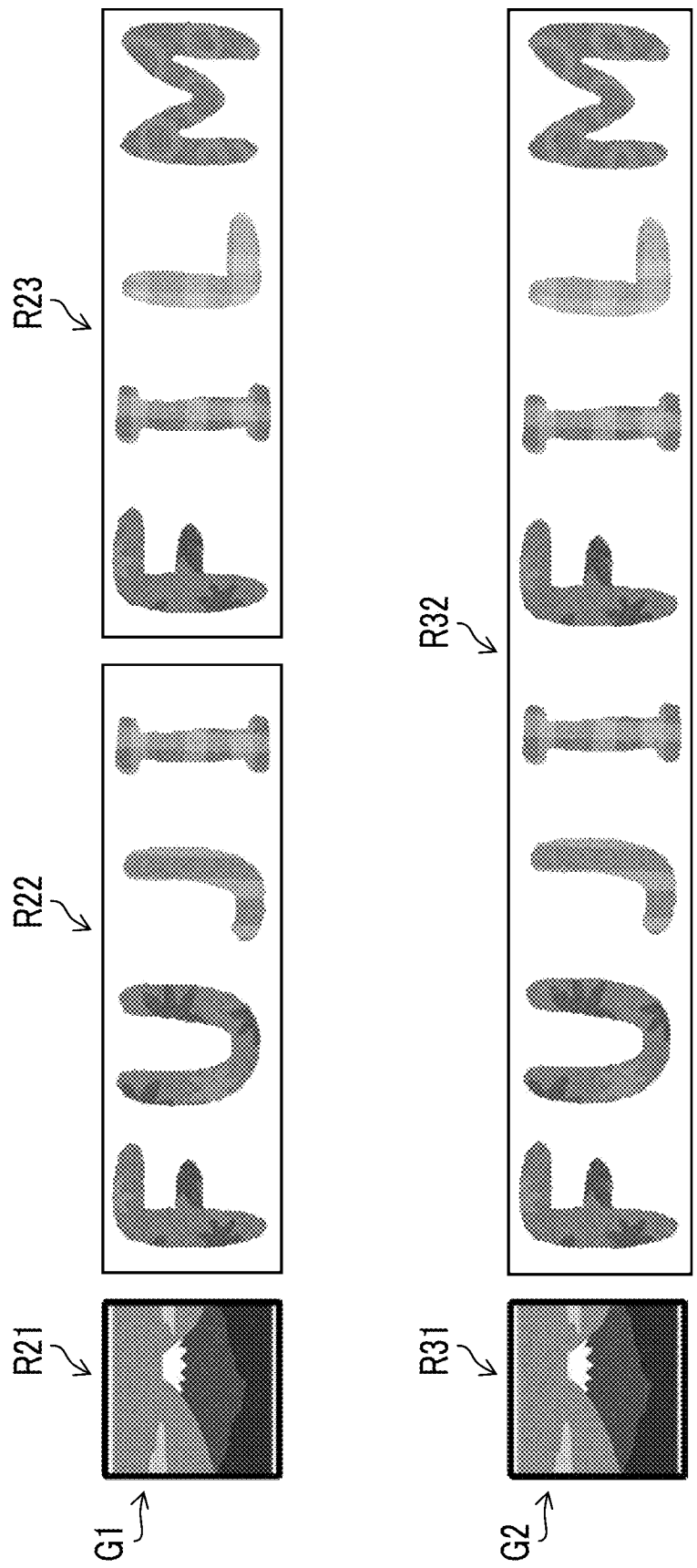
FIG. 8 is an example of an analysis result of an analysis unit.

FIG. 8 is an example of the grouping candidates based on the analysis result of the analysis unit 70. In a grouping candidate G1, the region R13 selected in Step S3 is grouped with the regions R12, R14, and R15 as a region R22. Further, here, the region R11 is independently grouped as a region R21, and the regions R16 to R19 are grouped as a region R23.

On the other hand, in a grouping candidate G2, the region R13 selected in Step S3 is grouped with the regions R12, and R14 to R19 as a region R32. Further, the region R11 is independently grouped as a region R31.

The output unit 72 displays each of the grouping candidate G1 and the grouping candidate G2 on the touch panel display 14. As the grouping candidates for the region R13 selected in Step S3, only the region R22 and the region R32 may be displayed.

Among the plurality of grouping candidates displayed on the touch panel display 14, the user selects a desired grouping candidate by the touch operation on the touch panel display 14 so that the selected grouping candidate is decided as the user's region of interest. The output unit 72 displays the decided region of interest on the touch panel display 14, and stores the decided region of interest in the non-volatile memory 36, and the processing of the flowchart is ended. The output unit 72 may store all of the grouping candidates in the non-volatile memory 36.

In this manner, a plurality of grouping candidates are displayed, and the user selects the grouping candidate, so that the user's region of interest can be more accurately extracted.

In the example illustrated in FIG. 8, the analysis unit 70 analyzes the similarity degree of the pixel values of the color, brightness, and the like of the pixels as the relationship, but the relationship analyzed by the analysis unit 70 is not limited to the similarity degree.

For example, in a case where each of the regions constitutes a part of a character, the relationship analyzed by the analysis unit 70 includes whether or not the regions are in a relation of being combined to constitute one character.

FIG. 9 is a diagram illustrating an example in which a character is divided into a plurality of regions. In the case illustrated in FIG. 9, the analysis unit 70 analyzes the relationship between "イ" in a region R41 and "ヰ" in a region R42, and determines that both the regions are in a relation of constituting one character "伊". Therefore, the output unit 72 groups the region R41 and the region R42 as one region R43, and outputs the region R43.

Similarly, the analysis unit 70 analyzes the relationship between "●" in a region R44 and "I" in a region R45, and determines that both the regions are in a relation of constituting one character "i". Therefore, the output unit 72 groups the region R44 and the region R45 as one region R46, and outputs the region R46.

In addition, in a case where the respective regions constitute one character or a plurality of characters, the relationship analyzed by the analysis unit 70 includes whether or not the regions are combined to have a relationship corresponding to any one of one word, an abbreviation, a trade name, or the like.

Figure 10:
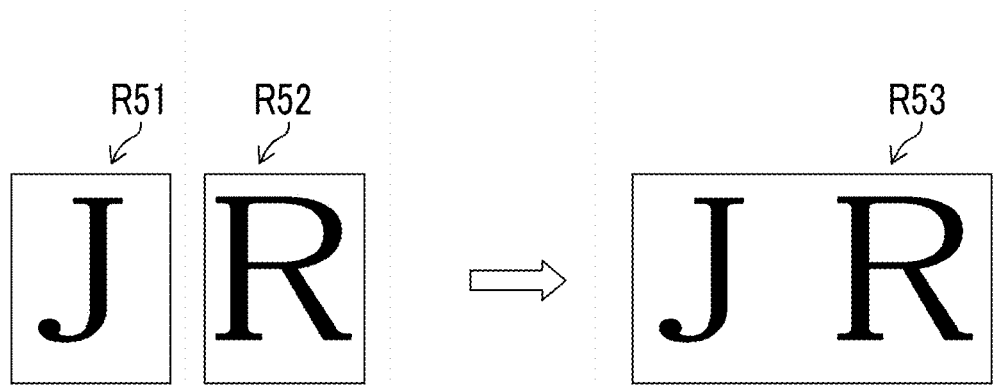
FIG. 10 is a diagram illustrating an example in which each region constitutes one character.

FIG. 10 is a diagram illustrating an example in which each region constitutes one character. In the case illustrated in FIG. 10, the analysis unit 70 analyzes the relationship between "J" in a region R51 and "R" in a region R52, and determines that both the regions are in a relation of constituting "JR" which is (a part of) one trade name Therefore, the output unit 72 groups the region R51 and the region R52 as one region R53, and outputs the region R53.

Similarly, in a case where the regions R12 to R19 illustrated in FIG. 7 are recognized as regions consisting of characters "F", "U", "J", "I", "F", "I", "L", and "M", respectively, the analysis unit 70 analyzes the relationship of these regions, and can determine that the regions are a region constituting a word "FUJI" and in a region constituting a word "FILM". Therefore, the output unit 72 groups the regions as "FUJI" and "FILM", and outputs "FUJI" and "FILM".

In this case, the analysis unit 70 further analyzes the relationship between the region constituting the word "FUJI" and the region forming the word "FILM", and can determine that the regions are in a relation of forming a trade name "FUJIFILM". In this case, the output unit 72 groups the regions as "FUJIFILM", and outputs "FUJIFILM".

Further, the relationship analyzed by the analysis unit 70 includes whether the regions have a relationship of forming an object in a case where the regions are combined.

FIG. 11 is a diagram illustrating an example in which each region constitutes one object. In the case illustrated in FIG. 11, the analysis unit 70 analyzes the relationship among a region R61 and a region R62 of a metal portion, a region R63 of a resin portion, a region R64 of a plastic portion, a region R65 and a region R66 of a glass portion, and a region R67 and a region R68 of a rubber portion, and can determine that the regions R61 to R68 have a relationship of constituting an automobile. Therefore, the output unit 72 groups the regions R61 to R68 as one region R70, and outputs the region R70.

In the above description, the analysis unit 70 analyzes the relationship between a selected selection region and a region adjacent to the selection region, but the region of which the relationship is to be analyzed is not limited to the adjacent region.

FIG. 12 is a diagram illustrating an example of a range limited by the range limiting unit 64, and is a diagram illustrating an example in which regions that are not adjacent to each other constitute one object. In the example illustrated in FIG. 12, the image is divided into regions in a grid pattern, and there are regions R81 to R88 of which the relationship for the similarity degree of pixel values is high and which are dispersed without being adjacent to each other.

Here, it is assumed that the region R81 is selected by the selection unit 68. The analysis unit 70 analyzes the relationship for not only the region adjacent to the selected region R81 but also the region in the vicinity. The region in the vicinity refers to a region present within a range of a certain distance.

As a result, the analysis unit 70 determines that the relationship between the region R81 and the regions R82 and R88 among the regions in the vicinity of the region R81 is high. In this case, the analysis unit 70 analyzes the relationship with the region R81 for the regions further in the vicinity of the regions R82 and R88. As a result, the analysis unit 70 determines that the relationship between the region R81 and the regions R83 and R87 is high. In this manner, in a case where the region in the vicinity is a region with a high relationship, the analysis unit 70 analyzes the relationship by expanding the regions in the vicinity in order, and thereby the output unit 72 can group the regions R81 to R88 as one region R90, and output the region R90, as illustrated in FIG. 12.

The output unit 72 may group only the regions R81 to R88 as the region R90, or may group regions including the region present between the regions in addition to the regions R81 to R88 as the region R90. In a case where only the regions R81 to R88 are grouped as the region R90, regions present between the regions may be treated as transparent regions.

In this manner, according to the embodiment, in a case where a user desires to extract a region of interest from an image, it is possible to more accurately extract with fewer operations.

<Others>

Here, the tablet type computer terminal has been described as an example of the portable terminal device to which the image processing device is applied, but the image processing device can also be applied to mobile communication terminals such as smartphones and mobile phones, laptop personal computers, and the like.

The above-described image processing method may be configured as a program for causing a computer to realize each step, and a non-transitory recording medium such as a compact disk read-only memory (CD-ROM) in which the program is stored may be configured.

In the above-described embodiment, the hardware structures of processing units executing various kinds of processing of the region extraction unit 60 are the following various processors. The various processors include a central processing unit (CPU) as a general-purpose processor executing software (program) and functioning as various processing units, a graphics processing unit (GPU) as a processor specialized for image processing, a programmable logic device (PLD) as a processor of which the circuit configuration can be changed after manufacturing such as a field programmable gate array (FPGA), a dedicated electrical circuit or the like as a processor having a circuit configuration designed exclusively for executing a specific process such as an application specific integrated circuit (ASIC).

One processing unit may be configured by one of the various processors, or configured by the same or different kinds of two or more processors (for example, combination of a plurality of FPGAs, combination of the CPU and the FPGA, combination of the CPU and the GPU, or the like). In addition, a plurality of processing units may be configured by one processor. As an example where a plurality of processing units are configured by one processor, first, there is a form where one processor is configured by a combination of one or more CPUs and software as typified by a computer, such as a server and a client, and this processor functions as a plurality of processing units. Second, there is a form where a processor fulfilling the functions of the entire system including a plurality of processing units by one integrated circuit (IC) chip as typified by a system on chip (SoC) or the like is used. In this manner, various processing units are configured by using one or more of the various processors as hardware structures.

Furthermore, the hardware structures of these various processors are more specifically electrical circuitry where circuit elements, such as semiconductor elements, are combined.

The technical scope of the invention is not limited to the scope described in the above embodiments. The configurations and the like in the embodiments can be appropriately combined between the embodiments in a range not departing from the gist of the invention.

Explanation of References

10: tablet type computer terminal (tablet PC)
12: housing
14: touch panel display
14A: display section
14B: touch panel section
16: operation button
18: speaker
20: built-in camera
20A: imaging lens
20B: imaging element
24: external connection terminal
32: system bus
34: main memory
36: non-volatile memory
38: mobile communication unit
38A: antenna
40: wireless LAN communication unit
40A: antenna
42: short-range wireless communication unit
42A: antenna
44: wired communication unit
46: touch panel display controller
50: key input unit
52: sound processing unit
54: imaging processing unit
60: region extraction unit
62: image acquisition unit
64: range limiting unit
66: region division unit
68: selection unit
70: analysis unit
72: output unit
74: correction processing unit
G1, G2: grouping candidate
R1: region
R11 to R19: region
R21 to R23: region
R31, R32: region
R41 to R46: region
R51 to R53: region
R61 to R68: region
R70: region
R81 to R88: region
R90: region
S1 to S5: each step of image processing method

What is claimed is:

1. An image processing device comprising a processor configured to:
acquire an image;
divide the acquired image into a plurality of regions;
select at least one region from among the plurality of divided regions;
analyze a relationship between the selected region and a region other than the selected region;
output a grouping candidate for a region belonging to the same group as the selected region from the analyzed relationship; and
in a case where there are a plurality of grouping candidates,
determine a grouping candidate based on a selection by a user from among the plurality of grouping candidates; and
analyze the relationship based on a trained machine learning model,
wherein the trained machine learning model is additionally trained using a relationship between a selected region of the determined grouping candidate and a region other than the selected region.

2. The image processing device according to claim 1, wherein the processor is configured to output a plurality of the grouping candidates.

3. The image processing device according to claim 1, wherein the processor is configured to select the at least one region on the basis of a user's input.

4. The image processing device according to claim 1, wherein the processor is configured to select the at least one region on the basis of a trained machine learning model.

5. The image processing device according to claim 1, wherein the processor is further configured to:
perform correction processing on the grouping candidate.

6. The image processing device according to claim 5, wherein the correction processing is geometric transformation processing.

7. The image processing device according to claim 5, wherein the correction processing is processing of modifying a contour line.

8. The image processing device according to claim 1, wherein the processor is configured to perform division into the plurality of regions by performing clustering on the basis of pixel information.

9. The image processing device according to claim 1, wherein the processor is configured to analyze a relationship between the selected region and a region adjacent to the selected region.

10. The image processing device according to claim 1, wherein the processor is configured to analyze a similarity degree between the selected region and the region other than the selected region.

11. The image processing device according to claim 1, wherein the processor is further configured to:

limit a range from the acquired image,
wherein the processor is configured to divide the image within the limited range into the plurality of regions.

12. A portable terminal device comprising:
the image processing device according to claim 1;
an imaging lens;
an imaging element that captures an optical image formed by the imaging lens; and
a display,
wherein the processor is configured to acquire image data output from the imaging element as an image, and
the processor is configured to display the grouping candidate on the display.

13. An image processing method comprising:
acquiring an image;
dividing the acquired image into a plurality of regions;
selecting at least one region from among the plurality of divided regions;
analyzing a relationship between the selected region and a region other than the selected region;
outputting a grouping candidate for a region belonging to the same group as the selected region from the analyzed relationship; and
in a case where there are a plurality of grouping candidates,
determining a grouping candidate based on a selection by a user from among the plurality of grouping candidates;
analyzing the relationship based on a trained machine learning model; and
additionally training the trained machine learning model using a relationship between a selected region of the determined grouping candidate and a region other than the selected region.

14. A non-transitory computer-readable recording medium which records thereon instructions that causes, when read by a computer, the computer to execute:
acquiring an image;
dividing the acquired image into a plurality of regions;
selecting at least one region from among the plurality of divided regions;
analyzing a relationship between the selected region and a region other than the selected region;
outputting a grouping candidate for a region belonging to the same group as the selected region from the analyzed relationship; and
in a case where there are a plurality of grouping candidates,
determining a grouping candidate based on a selection by a user from among the plurality of grouping candidates;
analyzing the relationship based on a trained machine learning model; and
additionally training the trained machine learning model using a relationship between a selected region of the determined grouping candidate and a region other than the selected region.

* * * * *